(No Model.)

W. W. C. SPENCER.
CERTIFICATE REPRESENTING VALUE.

No. 479,098. Patented July 19, 1892.

United States Patent Office.

WARREN W. C. SPENCER, OF BOSTON, MASSACHUSETTS.

CERTIFICATE REPRESENTING VALUE.

SPECIFICATION forming part of Letters Patent No. 479,098, dated July 19, 1892.

Application filed January 18, 1892. Serial No. 418,431. (No specimens.)

*To all whom it may concern:*

Be it known that I, WARREN W. C. SPENCER, of Boston, in the county of Suffolk, State of Massachusetts, have invented certain new and useful Improvements in Certificates Representing Value, of which the following is a description sufficiently full, clear, and exact to enable any person skilled in the art or science to which said invention appertains to make and use the same, reference being had to the accompanying drawing, forming part of this specification, in which the figure on the drawing illustrates in face view the general form or construction of my improved bond or stock certificate.

My invention relates especially to providing a stock or bond certificate with interest-coupons, each of which represents in addition an installment or proportionate part of the par value of said certificate, and a coupon representing a premium or value in addition to the face and interest of said certificate.

In the drawing, A represents the certificate considered as a whole. The body B thereof may be imprinted in any of the ordinary forms of stock or bonds, the par value thereof, which in the example shown is fifty dollars, being displayed. Attached to an edge of said body by a perforated line $b$, whereby it may readily be detached, there is what I term a "premium-coupon" C. This coupon represents a value outside the face value of the bond and is preferably in the form of an obligation of the maker of the bond to perform some act or deliver some value to the owner of the bond at a determined time. For example, the bond being given by a land company, the coupon C bears an obligation executed by said company to deliver to the holder of the bond a warranty-deed of a determined lot of land when the face value of said bond shall have been paid. A series of coupons D, preferably in number equal to the number of dollars for which the bond is given, is attached in the usual manner of interest-coupons to the body of the bond. The coupons are arranged consecutively and are designed as combination interest and installment coupons and are each so designated with the number, name of the company issuing the same, and date when the interest is due, as shown in coupon "No. 1." In addition the coupon is imprinted with the amount of an installment, as "Inst. $1," and circle $d$ for a seal, impression, or perforation effected when the installment shall have been paid.

The bond, as in the example, is issued and delivered to the purchaser, with the body B and premium-coupon C, properly filled in, upon payment by said purchaser of the installment amount (one dollar) on coupon D, No. 1, and said coupon is stamped at $d$, furnishing a receipt for the holder that the first installment has been paid. This cancels the coupon so far as the installment is concerned; but it still represents an obligation on the part of the maker to pay the interest as per its face.

The coupons may be payable as to installments each week and each be for a like amount. At the end of fifty weeks, coupon No. 50 having been paid, the maker of the bond will have received the face value thereof, or fifty dollars. The premium called for in coupon C is now delivered to the holder of the bond and said coupon is detached and canceled, furnishing a voucher for the maker that its obligation thereon expressed has been fulfilled. The bond now becomes interest-bearing on its face value and the coupons D payable at determined times in the ordinary manner of interest-bearing stocks or bonds of the usual form.

Any arrangement of the body and coupons other than that shown may be made, as desired, and the installment payments indicated in any suitable way; or the coupons D may represent interest alone, the certificate being furnished with a premium-coupon or coupon representing a value or an obligation on the part of the maker to the holder additional to that represented by the face of the certificate and interest thereon.

Having thus explained my invention, what I claim is—

1. A bond-certificate or other paper representing value or an obligation on the part of the maker, provided with a coupon representing a premium value or obligation additional to that borne by the body of said certificate or the interest thereon, substantially as described.

2. A certificate or other paper representing value, provided with a series of interest-coupons and a premium-coupon representing an additional value or an obligation on the part of the maker, substantially as described.

3. A certificate representing value, comprising a body bearing on its face the amount of such value, a series of installment-coupons, each representing an amount the aggregate of which equals the amount of said certificate-body, and a premium-coupon representing value additional to the amount of said body, substantially as described.

4. A certificate representing value, comprising the body B, a series of combined interest and installment coupons D, and a premium-coupon C, arranged substantially as described.

WARREN W. C. SPENCER.

Witnesses:
O. M. SHAW,
K. DURFEE.